US008160427B2

(12) United States Patent
Urushihara et al.

(10) Patent No.: US 8,160,427 B2
(45) Date of Patent: Apr. 17, 2012

(54) RECORDING METHOD, RECORDING APPARATUS, AND COMPUTER-READABLE MEDIUM

(75) Inventors: Masashi Urushihara, Kawasaki (JP);
Takashi Terasaki, Kawasaki (JP);
Kunihiko Chikaue, Kawasaki (JP);
Hiroshi Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 685 days.

(21) Appl. No.: 12/277,350

(22) Filed: Nov. 25, 2008

(65) Prior Publication Data

US 2009/0148130 A1   Jun. 11, 2009

(30) Foreign Application Priority Data

Dec. 7, 2007   (JP) ................. 2007-317119

(51) Int. Cl.
   *H04N 5/76* (2006.01)
(52) U.S. Cl. ...................... 386/295; 386/296
(58) Field of Classification Search .................. 386/200, 386/291, 292, 295
   See application file for complete search history.

(56) References Cited

U.S. PATENT DOCUMENTS

| 2001/0002832 A1* | 6/2001 | Hoshi ........................... 345/327 |
| 2005/0289635 A1 | 12/2005 | Nakamura et al. ............ 725/134 |
| 2006/0198607 A1* | 9/2006 | Ju ................................... 386/95 |

FOREIGN PATENT DOCUMENTS

| JP | 10-275068 | 10/1998 |
| JP | 2000-295554 | 10/2000 |
| JP | 2005-346826 | 12/2005 |
| JP | 2006-324781 | 11/2006 |
| JP | 2007-200484 | 8/2007 |

OTHER PUBLICATIONS

Korean Office Action issued Mar. 30, 2010 in corresponding Korean Patent Application 10-2008-0121710.
Chinese Office Action issued Jan. 22, 2010 in corresponding Chinese Patent Application 200810177130.7.

* cited by examiner

*Primary Examiner* — Huy T Nguyen
(74) *Attorney, Agent, or Firm* — Staas & Halsey LLP

(57) ABSTRACT

A program extraction engine 421 of an automatic recording module 42h extracts recommended programs, recording of which is recommended, out of programs scheduled to be broadcasted. A scheduling program 423 of the automatic recording module 42h does not store the recommended programs in the storage medium when a provisional free capacity of the storage medium does not exceed a first threshold or when a provisional total data amount exceeds a second threshold even if the provisional free capacity exceeds the first threshold.

9 Claims, 13 Drawing Sheets

FIG. 4

42d: RECORD-SCHEDULED TV PROGRAM MANAGEMENT TABLE

| DATE | START | TIME | CHANNEL | TITLE | PREDICTED SIZE | AUTOMATIC RECORDING |
|---|---|---|---|---|---|---|
| 2007/11/26 | 21:00 | 00:54 | 8 | GALILEI NO TABI | 256MB | ON |
| 2007/11/27 | 19:56 | 00:58 | 12 | HONKE! MANPUKU-YA | 1.0GB | OFF |
| 2007/11/28 | 21:00 | 00:54 | 10 | DEKUNOBO | 400MB | ON |
| 2007/11/29 | 21:00 | 00:54 | 6 | CHAPATSU SENSEI | 1.5GB | ON |
| 2007/11/30 | 22:00 | 00:54 | 4 | MAIHIME | 500MB | ON |

FIG. 5

42f: RECORDED TV PROGRAM MANAGEMENT TABLE

| FILE NAME | SIZE | AUTOMATIC RECORDING | DATE | START | CHANNEL | TITLE |
|---|---|---|---|---|---|---|
| PG00553.mpg | 1.2GB | ON | 2007/11/19 | 21:00 | 8 | GALILEI NO TABI |
| PG00554.mpg | 700MB | OFF | 2007/11/20 | 19:30 | 1 | CLOSE-UP KODAI |
| PG00555.mpg | 400MB | OFF | 2007/11/20 | 23:00 | 12 | BUSINESS ZAPPO |
| PG00556.mpg | 1.5GB | ON | 2007/11/22 | 21:00 | 6 | CHAPATSU SENSEI |
| PG00557.mpg | 300MB | OFF | 2007/11/24 | 19:00 | 4 | SHUSAI! IKARIYA SUIZOKUKAN |

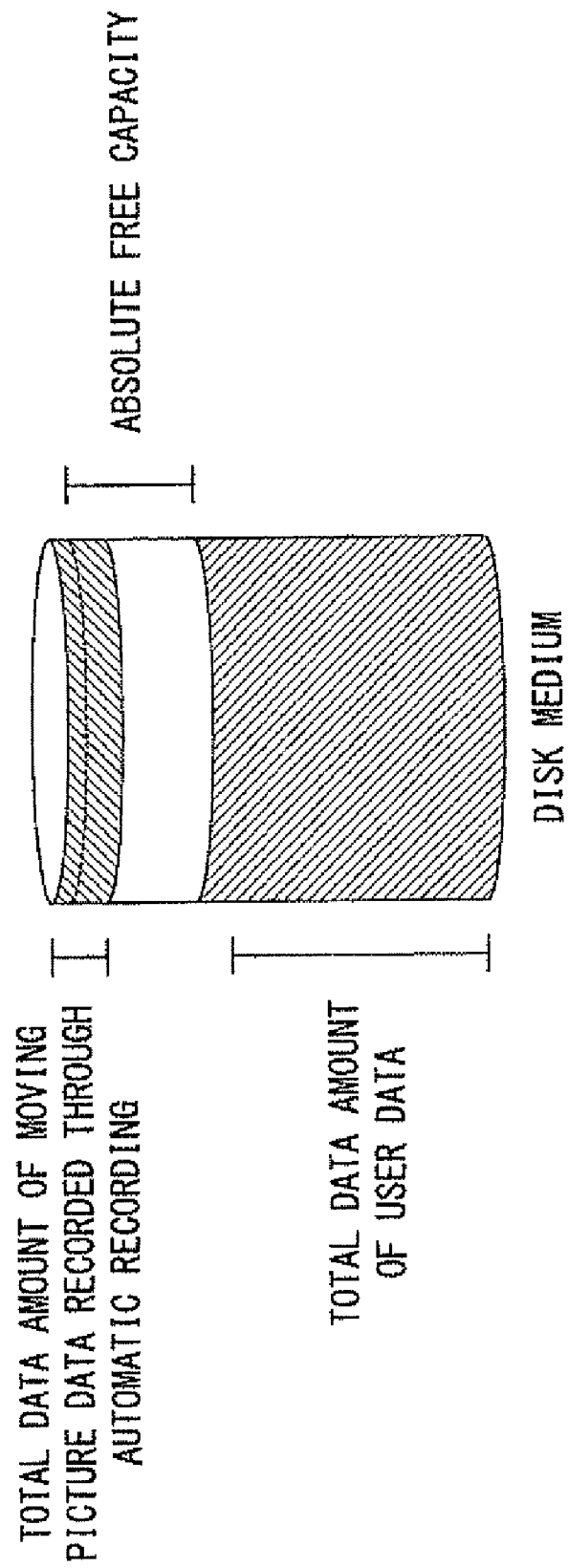

RECORDING METHOD, RECORDING APPARATUS, AND COMPUTER-READABLE MEDIUM

CROSS-REFERENCE TO RELATED APPLICATION

This application is based upon and claims the benefit of priority of the prior Japanese Patent Application No. 2007-317119 filed on Dec. 7, 2007, the entire contents of which are incorporated herein by reference.

FIELD

The embodiment discussed herein is related to a method, an apparatus, and a computer program for recording a television (TV) program broadcasted by a broadcasting station.

BACKGROUND

As it is well-known, a so-called TVPC is a personal computer added with a television function of viewing and recording a broadcasted TV program. In general, this television function is realized by installing a tuner device and television (TV) software in the personal computer.

In recent years, implementation of an automatic recording function in this television function has been considered. The television function includes a function of acquiring TV program data from a broadcasting station through a broadcast wave or through the Internet in order to make it possible to present an operator with a list of TV programs scheduled to be broadcasted. The automatic recording function extracts TV program data that satisfies a predetermined condition out of the TV program data acquired by using this program information acquiring function and stores a TV program specified by the extracted TV program data on a storage medium such as a disk medium as moving picture data when the TV program is broadcasted.

However, if the automatic recording function is adapted to endlessly store extracted TV programs in the storage medium, a free capacity of the storage medium is exhausted sooner or later. Then, it is likely that text data and graphic data obtained by other application programs cannot be stored in the storage medium of the TVPC and new software cannot be installed. If a free capacity of the storage medium is too small, it is also likely that operations of the TVPC become unstable.

[Patent document 1] Japanese Patent Application Laid-open No. 2006-324781

[Patent document 2] Japanese Patent Application Laid-open No. 2005-346826

SUMMARY

The embodiment discussed herein has been devised in view of such problems of the conventional technologies described above and it is therefore an object of the recording program to appropriately limit storage of moving picture data into a storage medium by the automatic recording function.

In order to solve the problems described above, a devised recording program is, in order to store a TV program broadcasted by a broadcasting station into a storage medium as moving picture data, characterized by causing a computer to function as: extracting means that extracts a recommended TV program, recording of which is recommended, among TV programs scheduled to be broadcasted by the broadcasting station; first judging means that judges whether a provisional free capacity exceeds a predetermined first threshold, the provisional free capacity being a remainder obtained by subtracting a data amount required for recording of the recommended TV program extracted by the extracting means from a free capacity of the storage medium; acquiring means that acquires, when the first judging means judges that the provisional free capacity exceeds the predetermined first threshold, a total data amount of moving picture data stored as the recommended TV program among moving picture data already stored in the storage medium; second judging means that judges whether a provisional total data amount exceeds a predetermined second threshold, the provisional total data amount being obtained by adding the data amount required for recording the recommended TV program extracted by the extracting means to the total data amount acquired by the acquiring means; and storing means that stores, when the second judging means judges that the provisional total data amount is smaller than the predetermined second threshold, the recommended TV program extracted by the extracting means in the storage medium as the moving picture data when the recommended TV program is broadcasted.

With this configuration, when the provisional free capacity of the storage medium does not exceed the first threshold or when the provisional total data amount exceeds the second threshold even if the provisional free capacity exceeds the first threshold, the computer operates not to perform storage of the recommended TV programs in the storage medium. Therefore, it is unlikely that text data and graphic data obtained by other application programs cannot be stored and new software cannot be installed. Moreover, it is unlikely that operations of the computer become unstable.

Note that the operations related to the recording program disclosed above can also be realized by a recording method or a recording apparatus. In other words, these operations may be realized by a recording method of executing, by the computer, functions equivalent to the respective means of the recording program described above as a plurality of steps, or may be realized by a recording apparatus including a plurality of units that function equivalently to those respective means.

Therefore, with the disclosed recording program, storage of moving picture data in the storage medium by the automatic recording function is appropriately limited.

BRIEF DESCRIPTION OF THE DRAWINGS

FIG. 4 A diagram schematically showing a record-scheduled TV program management table.

FIG. 5 A diagram schematically showing a recorded program TV management table.

FIG. 13 A diagram showing a relation between a stored data amount and an absolute free capacity.

DESCRIPTION OF EMBODIMENT

An embodiment of the recording program described above will hereinafter be described with reference to the accompanying drawings.

(Configuration)

Figure 1:
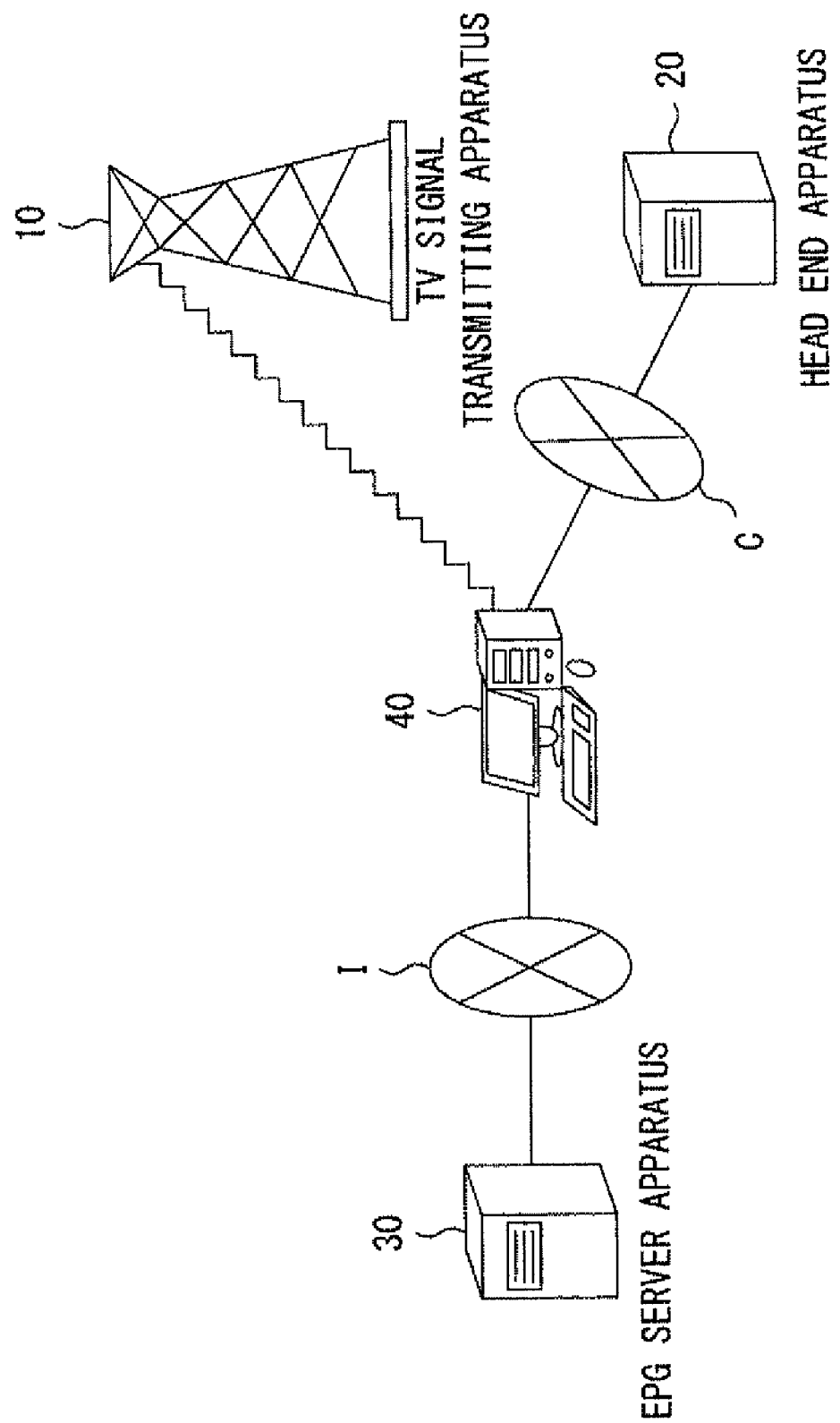
FIG. 1 A block diagram showing a configuration of a computer network system according to an embodiment of the recording program disclosed above.

FIG. 1 is a block diagram showing a configuration of a computer network system according to the embodiment.

As illustrated in FIG. 1, the computer network system according to this embodiment includes a TV signal transmitting apparatus 10, a head end apparatus 20, an electronic program guide (EPG) server apparatus 30, and a personal computer with a television function (hereinafter, abbreviated as TVPC) 40. Among those apparatuses, the TVPC 40 is connected to the head end apparatus 20 via a community antenna television (CATV) network C and also connected to the EPG server apparatus 30 via the Internet I.

The TV signal transmitting apparatus 10 is an apparatus that broadcasts a TV signal in a form of a radio wave, and is set in a facility of a broadcasting station. Note that EPG information used for displaying a list of TV programs scheduled to be broadcasted by the broadcasting station may be superimposed on the TV signal, which is broadcasted from the TV signal transmitting apparatus 10, as an EPG signal.

The head end apparatus 20 is an apparatus that transmits a TV signal received from the broadcasting station via a community antenna to the CATV network C, and is set in a facility of a cable television broadcasting company. Note that, when the head end apparatus 20 is a pass-through type that does not modify the TV signal received via the community antenna, the EPG information superimposed on the TV signal as the EPG signal reaches a reception side. When the head end apparatus 20 is a trans-modulation type that modifies the TV signal received via the community antenna, EPG information unique to the cable television broadcasting company may be superimposed on the TV signal, which is transmitted from the head end apparatus 20, as an EPG signal.

The EPG server apparatus 30 is an apparatus that provides a web client with EPG information that specifies TV programs in a week from now among TV programs scheduled to be broadcasted by respective broadcasting stations. When a request from a web client is received through the Internet I, the EPG server apparatus 30 transmits the EPG information to the web client through the Internet I.

Though not illustrated in the figure, as it is well-known, the EPG information has, for each of TV programs, TV program data including at least broadcast start date and time, running time, a channel number, and a title of the TV program.

The TVPC 40 is a personal computer added with a television function of viewing and recording a broadcasted TV program.

Figure 2:
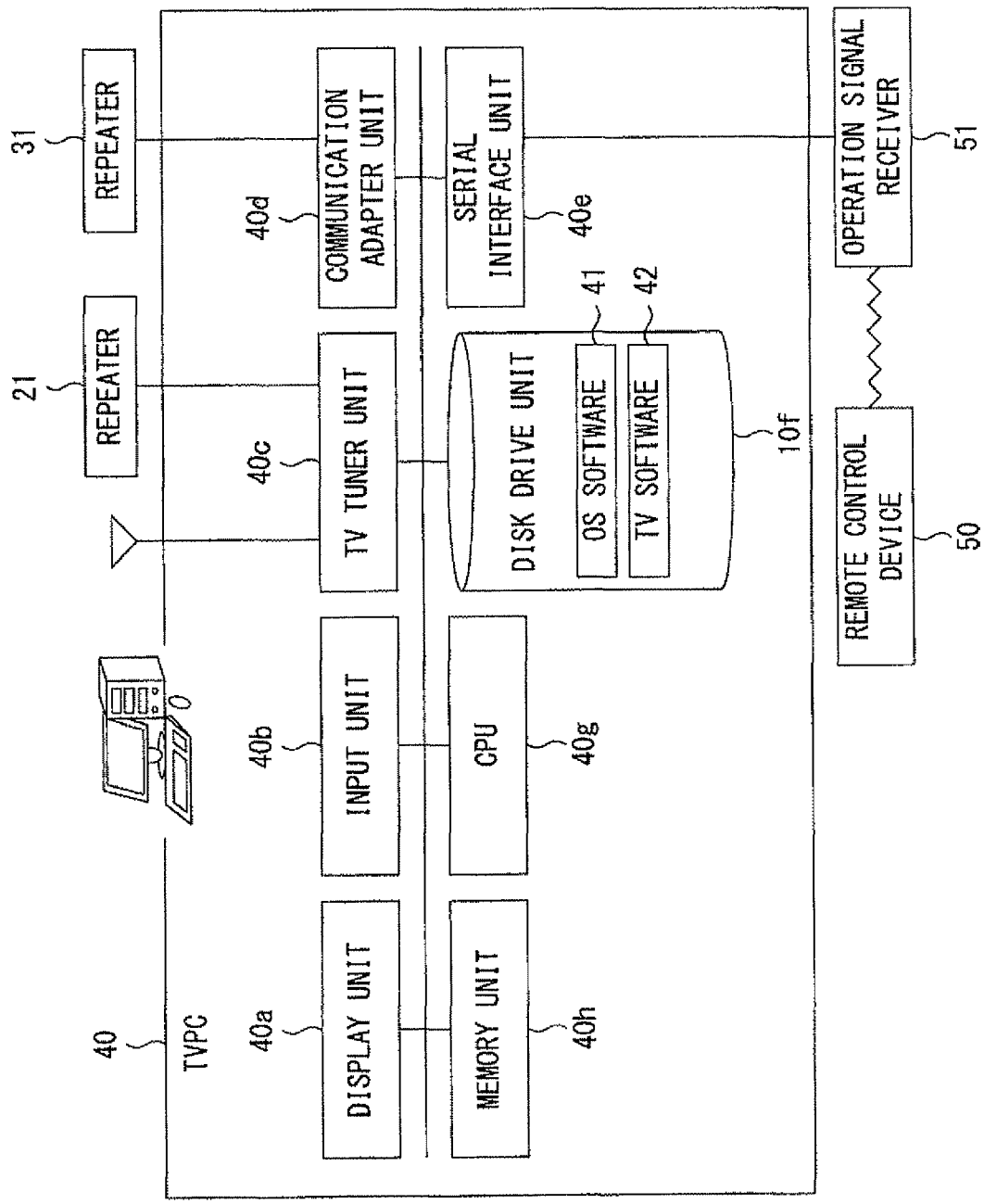
FIG. 2 A block diagram showing a configuration of a personal computer with a television function.

FIG. 2 is a block diagram showing a configuration of the TVPC 40.

As illustrated in FIG. 2, the TVPC 40 includes a display unit 40a such as a liquid crystal display, an input unit 40b such as a keyboard and a mouse, and a main body to which those units 40a and 40b are connected. At least a television (TV) tuner unit 40c, a communication adapter unit 40d, a serial interface unit 40e, a disk drive unit 40f, a central processing unit (CPU) 40g, and a memory unit 40h are incorporated in the main body.

The TV tuner unit 40c is a unit that receives a plurality of TV signals from the TV signal transmitting apparatus 10 and the head end apparatus 20 and extracts and digitizes a TV signal of a viewing target channel. This TV tuner unit 40c is also connected to a television antenna set in a general house via a coaxial cable and also connected to a repeater 21 in the CATV network C via a CATV cable. This TV tuner unit 40c is a TV tuner card incorporated in the main body of the TVPC 40c as a detachable expansion card. However, the TV tuner unit 40c may be a TV tuner box connected to the serial interface unit 40e described later. This TV tuner unit 40 may include hardware functioning as an encoder that compresses video data, which is acquired by digitizing a television signal, into a format reproducible on a personal computer. As the encoder, for example, there is a moving picture experts group (MPEG) encoder. Note that, when the TV tuner unit 40c is a type that does not include the hardware functioning as such an encoder, software functioning as the encoder needs to be installed in the disk drive unit 40f described later.

The communication adapter unit 40d is a unit that exchanges data with other computers on the Internet I. As such a communication adapter unit 40d, specifically, there is a network interface card or a local area network (LAN) card. This communication adapter unit 40d is connected to a repeater 31 in the Internet I via a network cable. As the repeater 31, there is a switching hub or a router.

The serial interface unit 40e is a unit that exchanges data with an external apparatus according to a serial communication protocol. As a specific communication protocol, there is universal serial bus (USE), RS-232C, or institute of electrical and electronic engineers (IEEE) 1394. This serial interface unit 40e is connected to, via a predetermined communication cable, an operation signal receiver 51 that receives an operation signal from a remote control device 50.

The disk drive unit 40f is a unit that readably and writably records various programs and various data in a disk medium. As such a disk drive unit 40f, specifically, there is a hard disk drive device, a digital versatile disk (DVD) drive device, a +R/+RW drive device, or a Blu-ray Disk (BD) drive device. As the disk medium, there is a hard disk, a DVD (including DVD-Recordable (DVD-R), DVD-Rewritable (DVD-RW), DVD-Read-Only-Memory (DVD-ROM), and DVD-Random-Access-Memory (DVD-RAM)), a +R/+RW, or a BD (including BD-R, BD-Rewritable (BD-RE), and BD-ROM). Note that, in the TVPC 40, instead of such a disk medium that requires mechanical driving, a nonvolatile semiconductor memory such as a flash memory set in a predetermined drive unit may be used. In other words, in this embodiment, a type of an adopted storage medium may be any type as long as various programs and various data can be freely read and written.

The CPU 40g is a unit that performs processing according to a program in the disk drive unit 40f. The memory unit 40h is a unit that the CPU 40g uses to cache a program and data and expand a work area.

In this TVPC 40, at least operating system (OS) software 41 and TV software 42 are stored in the disk drive unit 40f.

The OS software 41 is software that provides an application programming interface (API) and an application binary interface (ABI) to various application programs, manages storage areas of the disk drive unit 40f and the memory unit 40h, manages a process and a task, provides an application program with utilities such as file management, various setting tools, and an editor, and allocates windows that multiplex a screen output to a plurality of tasks.

The TV software 42 is software that adds a television function of viewing and recording a broadcasted TV program to a personal computer.

Figure 3:
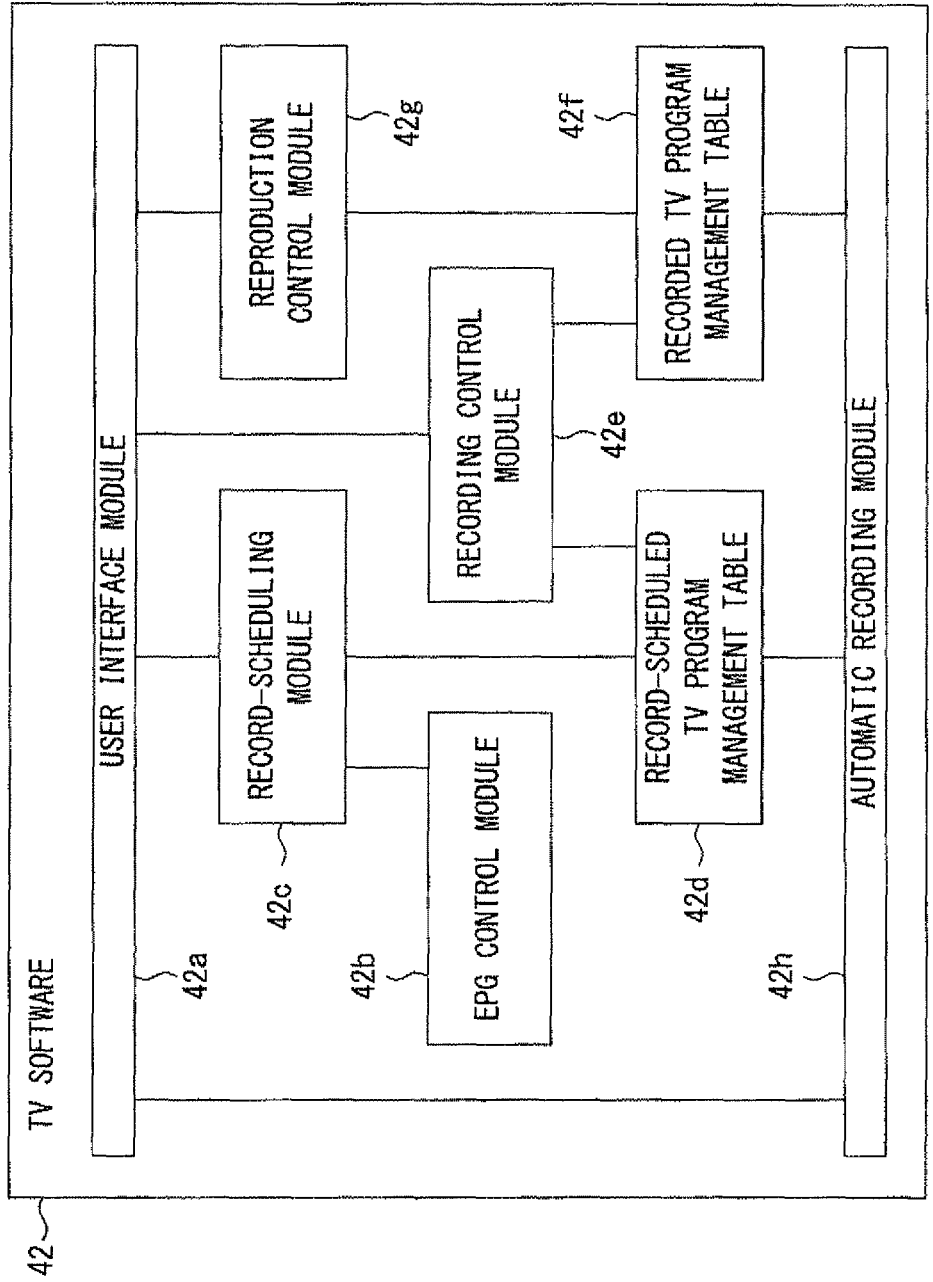
FIG. 3 A block diagram showing a configuration of a TV software.

FIG. 3 is a block diagram showing a configuration of the TV software 42.

As illustrated in FIG. 3, the TV software 42 includes a user interface module (program) 42a, an EPG control module (program) 42b, a record-scheduling module (program) 42c, a record-scheduled TV program management table 42d, a recording control module 42e, a recorded TV program management table 42f, a reproduction control module 42g, and an automatic recording module 42h.

The user interface module 42a is a module that receives, from the operator via a predetermined graphical user interface (GUI), list display of TV programs scheduled to be broadcasted, scheduling of recording of a TV program, display of a TV program being broadcasted, a start and a stop of recording of the TV program being broadcasted, reproduction of a recorded TV program, and condition for automatic recording described later, and instructs the record-scheduling module 42c, the recording control module 42e, or the reproduction control module 42g to perform the same.

The EPG control module 42b is a module that acquires, when a request from the operator is received via the user interface module 42a and the record-scheduling module 42c, EPG information from a TV signal received from the TV signal transmitting apparatus 10 or the head end apparatus 20, or EPG information from the EPG server apparatus 30. When the EPG information is received from the EPG control module 42b through the record-scheduling module 42c, the user interface module 42a selectively displays TV programs scheduled to be broadcasted within a week on the display unit 40a as a list on the basis of a plurality of pieces of TV program data included in the EPG information.

The record-scheduling module 42c is a module that performs record-scheduling of a TV program designated by the operator via the user interface module 42a among the TV programs scheduled to be broadcasted within a week. When the record-scheduling is performed, this record-scheduling module 42c calculates, on the basis of a set bit rate or the like, a file size (data amount) of moving picture data predicted for the TV program designated by the operator.

The record-scheduled TV program management table 42d is a table that the television function manages a TV program record-scheduled by the record-scheduling module 42c or the automatic recording module 42h described later.

FIG. 4 is a diagram schematically showing the record-scheduled TV program management table 42d.

As illustrated in FIG. 4, the record-scheduled TV program management table 42d has the same number of records as record-scheduled TV programs. The respective records have fields of "date", "start", "time", "channel", "title", "predicted size", and "automatic recording". The respective fields of "date", "start", and "time" are fields in which a date when a TV program, which is specified by fields of the record, is broadcasted, broadcast start time, and running time are recorded. The "channel" field is a field in which a number of a channel on which the TV program is broadcasted is recorded. The "title" field is a field in which a title of the TV program is recorded. The "predicted size" field is a field in which a file size (data amount) of moving picture data predicted for the TV program is recorded. The "automatic recording" field is a field in which an automatic recording flag indicating whether the TV program is a TV program recorded by the automatic recording module 42h described later is recorded. When the automatic recording flag is in an ON state, the automatic recording flag indicates that the TV program is recorded by the automatic recording module 42h described later. When the automatic recording flag is in an OFF state, the automatic recording flag indicates that the TV program is recorded when date and time, a period of time, and channel number are designated by the operator. Note that the respective records of the record-scheduled TV program management table 42d may have fields other than the fields described above, for example, fields in which an outline of content of the TV program, a list of casts, and a genre of the TV program are recorded, respectively.

A record is added to this record-scheduled TV program management table 42d by the record-scheduling module 42c. Every time the record-scheduling module 42c adds one record to the record-scheduled TV program management table 42d, the records in the record-scheduled TV program management table 42d are rearranged in order from one with the earliest broadcast start date and time.

The recording control module 42e of FIG. 3 is a module that executes, when a start and a stop of recording are instructed for a TV program being broadcasted by the operator via the user interface module 42a, the start and the stop of the recording, and executes recording of a TV program (generation and storage of moving picture data) registered in the record-scheduled TV program management table 42d. When a start of recording is instructed for a TV program being broadcasted by the operator via the user interface module 42a, the recording control module 42e starts recording of the TV program and stores the TV program in the disk drive unit 40f as moving picture data. When a stop of the recording of the program is instructed, the recording control module 42e adds a record of the TV program to the recorded TV program management table 42f described later. The recording control module 42e stays on standby until broadcast start time of a TV program set in an earliest recording order in the record-scheduled TV program management table 42d approaches and, when broadcast of the TV program is started, stores the TV program in the disk drive unit 40f as moving picture data. When the recording of the TV program is finished, the recording control module 42e deletes a record of the TV program from the record-scheduled TV program management table 42d and adds the record of the TV program to the recorded TV program management table 42f described later.

The recorded TV program management table 42f is a table that the television function manages programs stored in the disk drive unit 40f as moving picture data.

FIG. 5 is a diagram schematically showing the recorded program TV management table 42f.

As illustrated in FIG. 5, the recorded TV program management table 42f has the same number of records as TV programs stored in the disk drive unit 40f as moving picture data. The respective records have fields of "file name", "size", "automatic recording", "date", "start", "channel", and "title". The "file name" and "size" fields are fields in which a name and a size of a file having moving picture data for reproduction of a TV program, which is specified by fields of the record, stored therein are recorded, respectively. The "automatic recording" field is a field in which an automatic recording flag related to the TV program is recorded. Note that the automatic recording flag is set in an OFF state not only for moving picture data stored on the basis of record-scheduling designated with broadcast date and time, running time, and a channel number but also for moving picture data stored when a start and a stop of recording are manually performed for a TV program being broadcasted. The "date" and "start" fields are fields in which a date when the TV program is broadcasted and broadcast start time are recorded, respectively. The "channel" field is a field in which a number of a channel on which the TV program is broadcasted is recorded. The "title" field is a field in which a title of the TV program is recorded. Note that the respective records of the recorded TV program management table 42f may have fields other than the fields described above, for example, fields in which recording time, an outline of content of the TV program, a list of casts, and a genre of the TV program are recorded, respectively.

The reproduction control module 42g illustrated in FIG. 3 is a module that selectively presents, via the user interface module 42a, the operator with information concerning TV programs registered in the recorded TV program management table 42f, and executes reproduction of a TV program designated by the operator out of the TV programs for which the information is presented. The reproduction control module 42g is also a module that displays, on the display unit 40a, a TV program of a channel designated by the operator among TV programs being broadcasted.

The automatic recording module 42h is a module that extracts a TV program that satisfies a predetermined condition out of TV programs scheduled to be broadcasted by respective broadcasting stations and performs record-scheduling for the extracted TV program.

Figure 6:
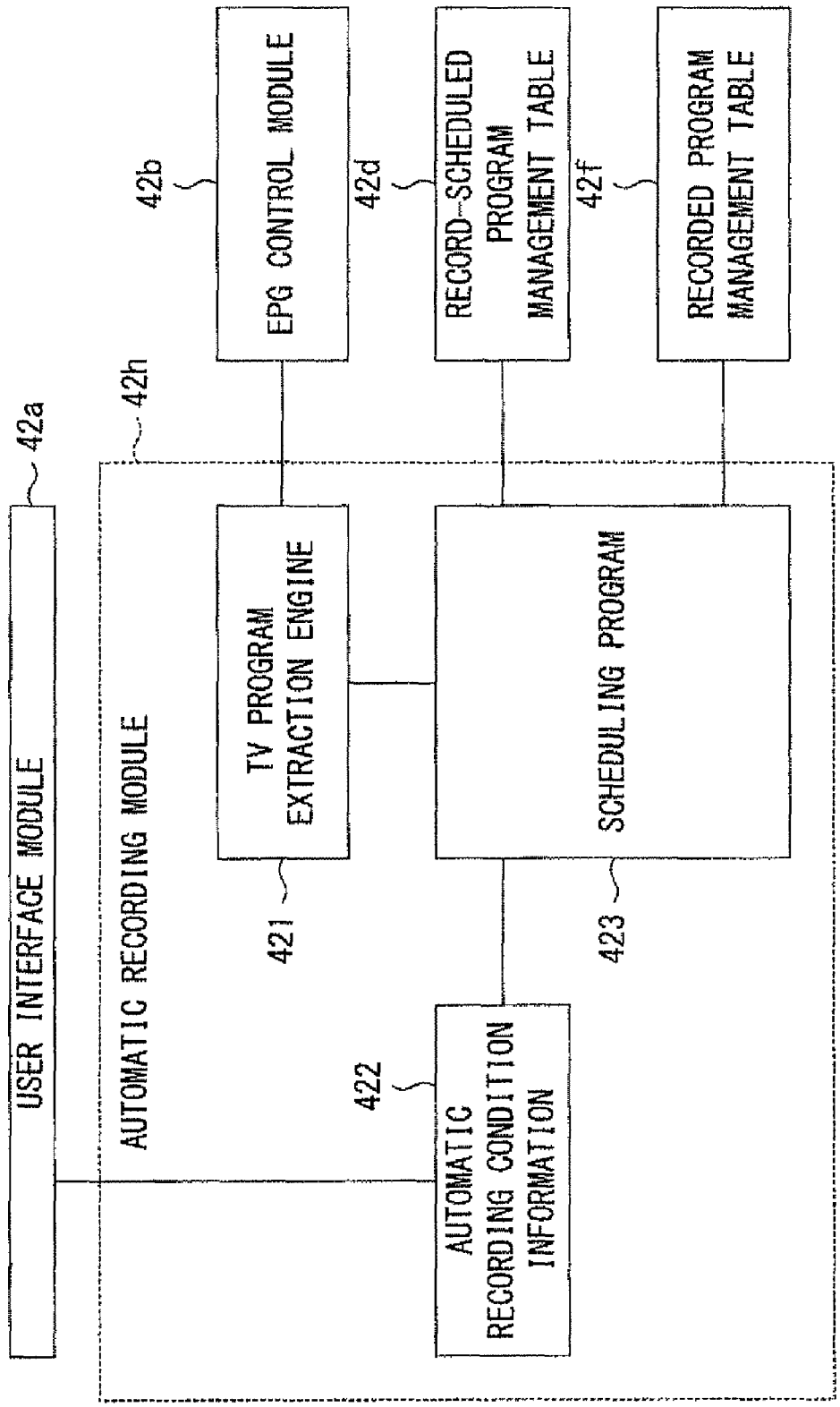
FIG. 6 A block diagram showing a configuration of an automatic recording module.

FIG. 6 is a block diagram showing a configuration of the automatic recording module 42h.

As illustrated in FIG. 6, the automatic recording module 42h includes a TV program extraction engine 421, automatic recording condition information 422, and a scheduling program 423.

The TV program extraction engine 421 is a component program for extracting TV program data of recommended TV programs, recording of which is recommended, out of TV program data included in EPG information acquired from the EPG server apparatus 30 via the EPG control module 42b. Note that a method of extracting TV program data of recommended TV programs out of a plurality of pieces of TV program data is explained in detail in the patent applications filed earlier by the applicant of this application (Japanese Patent Application No. 2006-305711, Japanese Patent Application No. 2006-324767, Japanese Patent Application No. 2007-231206, and Japanese Patent Application No. 2007-247950). Therefore, explanation of the method is omitted in this specification.

The automatic recording condition information 422 is information that specifies a condition concerning automatic recording. The automatic recording condition information 422 is stored in a predetermined area on the disk drive unit 40f and updated by the operator via the user interface module 42a. Note that the user interface module 42a may display an automatic recording condition setting screen on the display unit 40a as a GUI screen according to a predetermined instruction by the operator and receive the automatic recording condition information 422 from the operator through the automatic recording condition setting screen.

Figure 7:
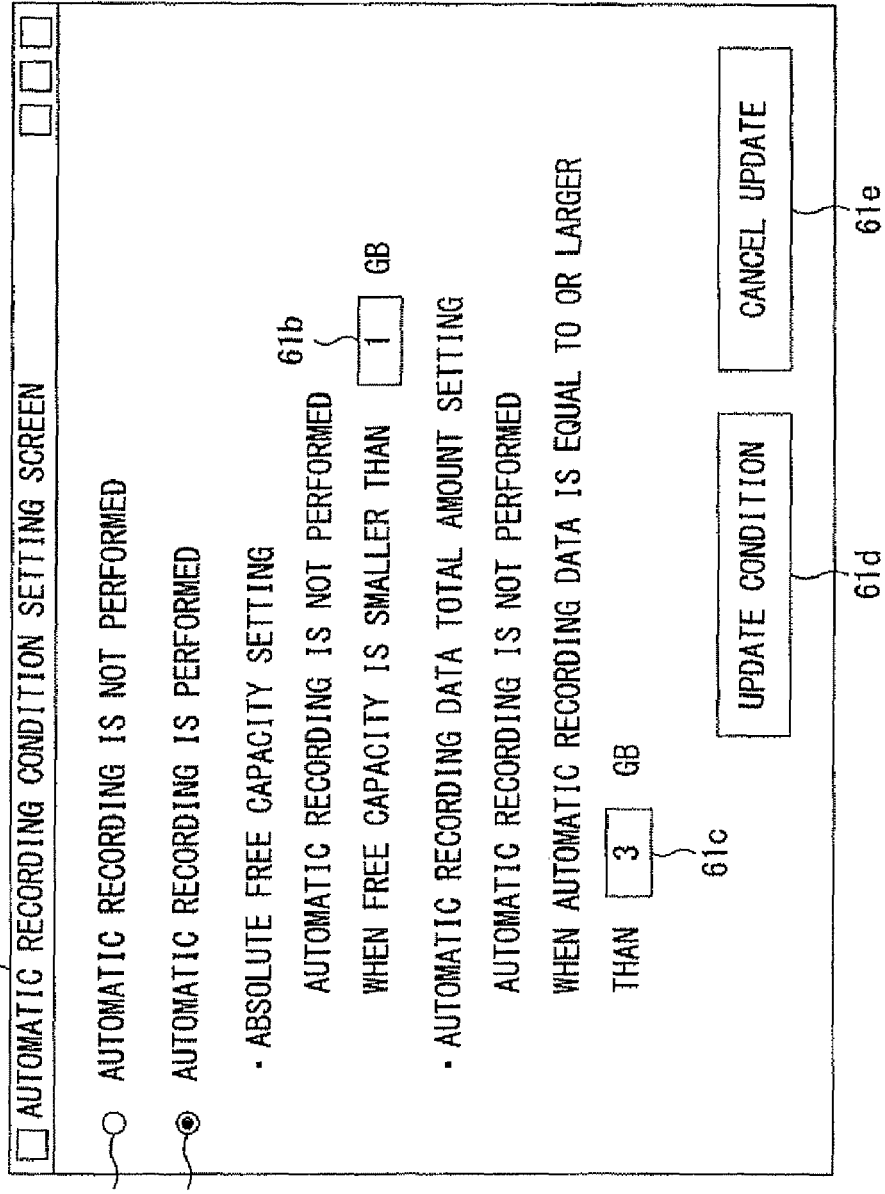
FIG. 7 A diagram showing an example of an automatic recording condition setting screen.

FIG. 7 is a diagram showing an example of the automatic recording condition setting screen 61.

As illustrated in FIG. 7, the automatic recording condition setting screen 61 includes a pair of radio buttons 61a and 61a, two text boxes 61b and 61c, and two buttons 61d and 61e. The pair of radio buttons 61a and 61a are buttons that the operator uses to designate whether automatic recording should be performed. The two text boxes 61b and 61c are buttons that function only when the automatic recording is designated to be performed. The first text box 61b is a text box that the operator uses to input, as a first threshold, a lower limit value of a free capacity of the disk medium in the disk drive unit 40f.

The second text box 61c is a text box that the operator uses to input, as a second threshold, an upper limit value of a total amount of file sizes (data amounts) of moving picture data stored in the disk medium by the automatic recording module 42h. The first button 61d is a condition update button that the operator uses to update the automatic recording condition information 422 according to information input to the pair of radio buttons 61a and 61a and the two text boxes 61b and 61c. The second button 61e is an update cancel button that the operator uses to cancel update work for the automatic recording condition information 422.

As it is evident from contents of this automatic recording condition setting screen 61, the automatic recording condition information 422 includes the designation information that designates whether automatic recording should be performed, the lower limit value (first threshold) of the free capacity of the disk medium in the case in which the automatic recording is designated to be performed, and the upper limit value (second threshold) of the total amount of file sizes of moving picture data stored through the automatic recording.

The scheduling program 423 illustrated in FIG. 6 is a program for performing scheduling of recording of recommended TV programs that satisfy a predetermined condition among recommended TV programs extracted by the TV program extraction engine 421. This scheduling program 423 is started, for example, at scheduled time every day (or once a week). When this scheduling program 423 is started, a scheduling process is generated. Contents of scheduling processing executed by (the CPU 40g operating as) this scheduling process are explained next.

(Processing)

Figure 8:
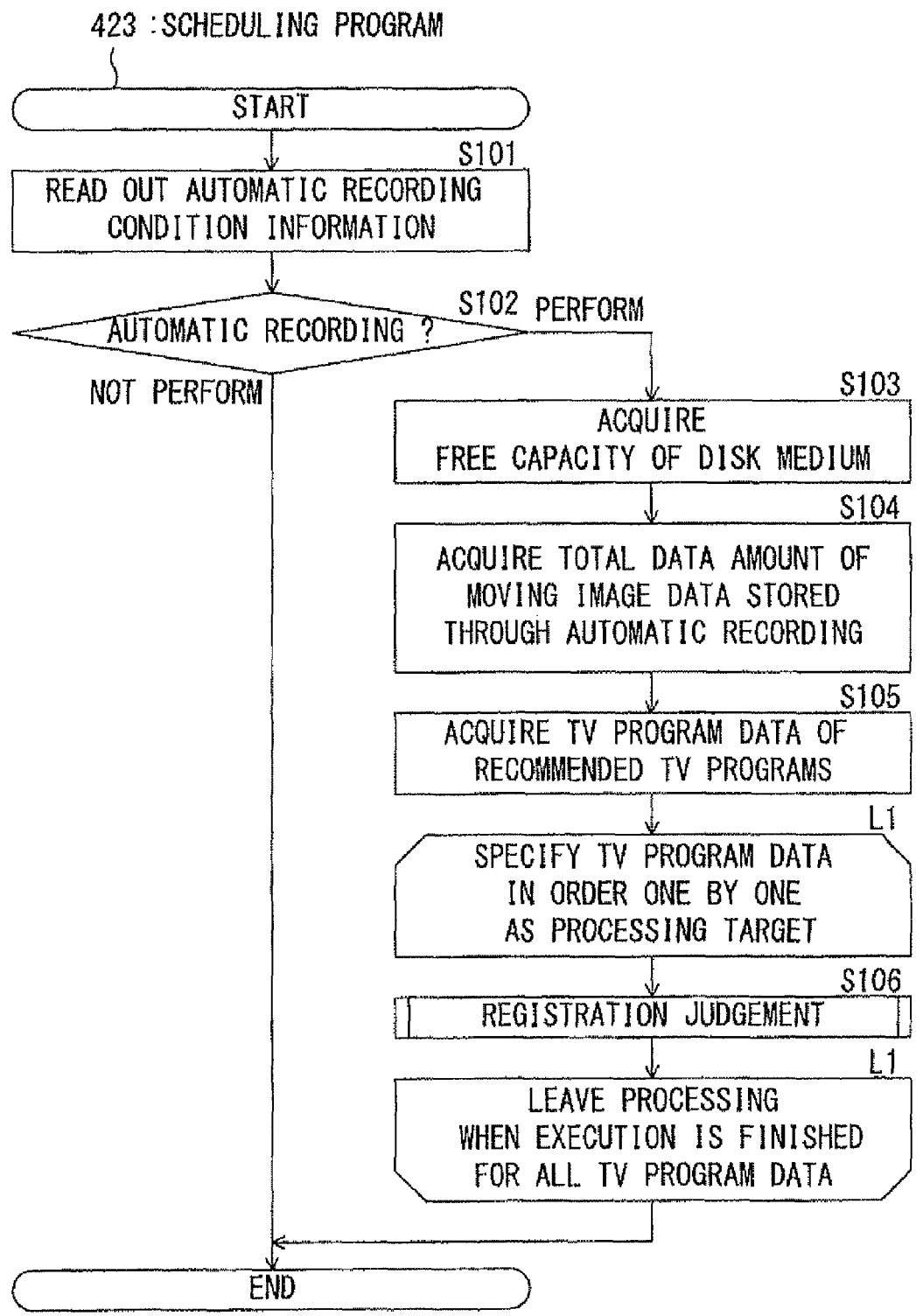
FIG. 8 A diagram showing a flow of a scheduling processing.

FIG. 8 is a diagram showing a flow of the scheduling processing.

After the scheduling processing is started, in first step S101, (the CPU 40g operating as) the scheduling process reads out the automatic recording condition information 422.

In next step S102, the scheduling process discriminates, on the basis of designation flag information included in the automatic recording condition information 422, whether the automatic recording is designated to be performed or designated not to be performed. When the automatic recording is designated not to be performed, the scheduling process finishes the scheduling processing illustrated in FIG. 8. On the other hand, when the automatic recording is designated to be performed, the scheduling process branches the processing from step S102 to step S103.

In step S103, the scheduling process acquires a value of a free capacity of the disk medium in the disk drive unit 40f. Specifically, the scheduling process gives a predetermined command to the OS software 41 and acquires the value of the free capacity of the disk medium from the OS software 41. Note that if the OS software 41 is Windows (trademark of Microsoft Corporation in the United States) manufactured by Microsoft Corporation, an API command called "GetDiskFreeSpaceEx" may be used.

In next step S104, the scheduling process reads all file sizes (data amounts) from all records, automatic recording flags of which are in the ON state, in the recorded TV program management table 42f and calculates a sum of the read file sizes to thereby acquire a total data amount. Therefore, this total data amount is a sum of data amounts of all moving picture data stored in the disk medium through the automatic recording.

In next step S105, the scheduling process acquires TV program data of recommended TV programs using the TV program extraction engine 421. Thereafter, the scheduling process executes a first processing loop L1.

Note that (the CPU 40g operating as) the scheduling process that executes step S105 and (the CPU 40g operating as) the program extraction engine 421 corresponds to the extracting means described above.

In the first processing loop L1, the scheduling process specifies the TV program data of the recommended TV programs, which are acquired in step S105, as a processing target one by one and executes step S106 for the TV program data specified as the processing target.

In step S106, the scheduling process executes a registration judgment subroutine.

Figure 9:
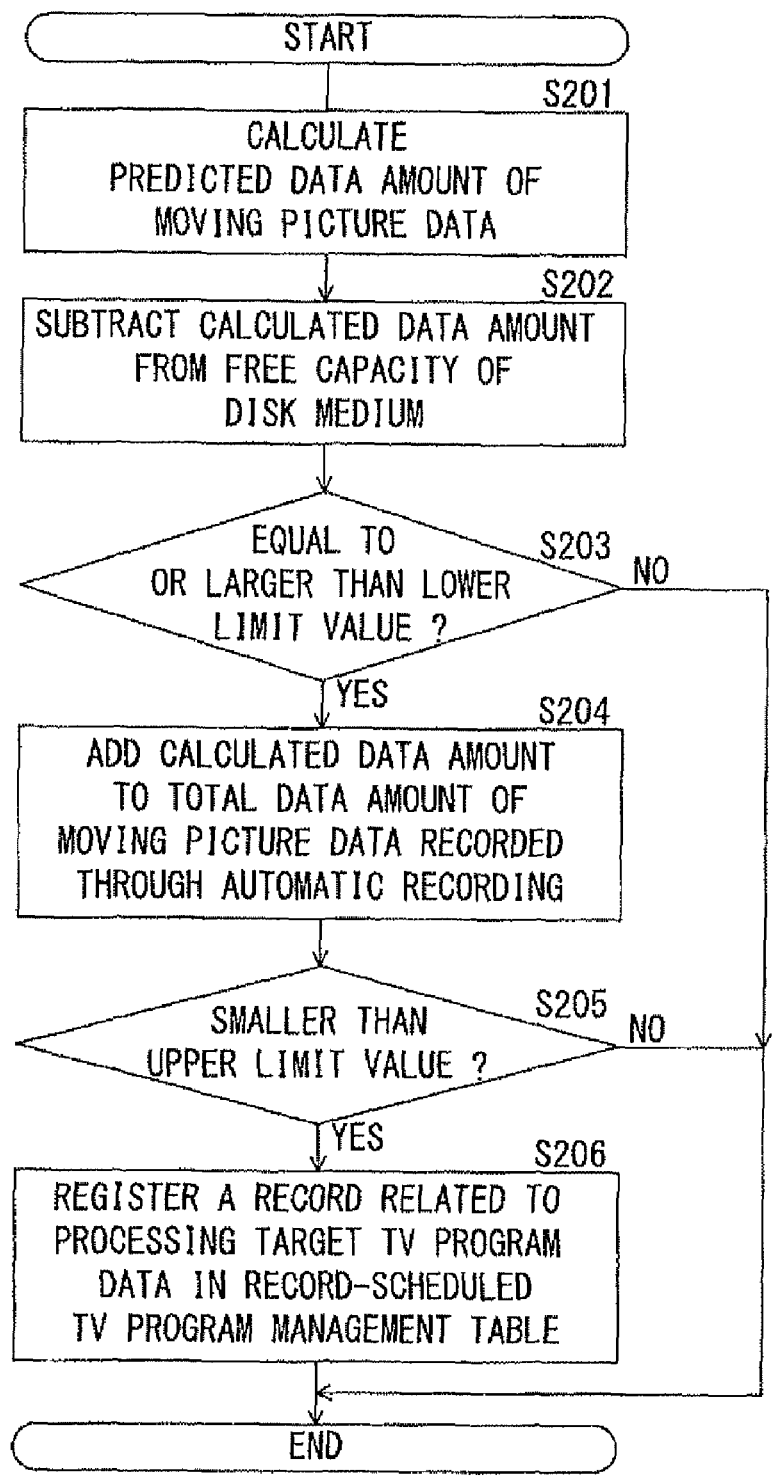
FIG. 9 A diagram showing a flow of a registration judgment subroutine.

FIG. 9 is a diagram showing a flow of the registration judgment subroutine.

After the registration judgment subroutine is started, in first step S201, the scheduling process calculates, on the basis of a set bit rate or the like, a file size (data amount) of moving picture data predicted for a TV program specified in the processing target TV program data.

In next step S202, the scheduling process subtracts the data amount calculated in step S201 from the free capacity of the disk medium acquired in step S103 of FIG. 8 to thereby acquire a provisional free capacity.

In next step S203, the scheduling process discriminates whether the provisional free capacity acquired in step S202 is equal to or larger than the lower limit value (first threshold, see 61b of FIG. 7) included in the automatic recording condition information 422 acquired in step S101 of FIG. 8. When the provisional free capacity is smaller than the lower limit value, the scheduling process branches the processing from step S203 and finishes the registration judgment subroutine illustrated in FIG. 9. On the other hand, when the provisional free capacity is equal to or larger than the lower limit value, the scheduling process advances the processing from step S203 to S204.

Note that (the CPU 40g operating as) the scheduling process that executes those steps S201 to S203 and step S103 of FIG. 8 corresponds to the first judging means described above.

In step S204, the scheduling process adds the data amount calculated in step S201 to the total data amount acquired in step S104 of FIG. 8 to thereby acquire a provisional total data amount.

Note that (the CPU 40g operating as) the scheduling process that executes this step S204 and step S104 of FIG. 8 corresponds to the acquiring means described above.

In next step S205, the scheduling process discriminates whether the provisional total data amount acquired in step S204 is smaller than the upper limit value (second threshold, see 61c of FIG. 7) included in the automatic recording condition information 422 acquired in step S101 of FIG. 8. When the provisional total data amount is equal to or larger than the upper limit value, the scheduling process branches the processing from step S205 and finishes the registration judgment subroutine illustrated in FIG. 9. On the other hand, when the provisional total data amount is smaller than the upper limit value, the scheduling process advances the processing from step S205 to S206.

Note that (the CPU 40g operating as) the scheduling process that executes this step S205 corresponds to the second judging means described above.

In step S206, the scheduling process registers a record related to the processing target TV program data in the record-scheduled TV program management table 42d (see FIG. 4), and subsequently rearranges the records in the record-scheduled TV program management table 42d in order from one with earliest broadcast start date and time.

Thereafter, the scheduling process finishes the registration judgment subroutine illustrated in FIG. 9.

Note that (the CPU 40g operating as) the scheduling process that executes this step S206 and the CPU 40g that executes the recording control module 42e correspond to the storing means described above.

After finishing the registration judgment subroutine illustrated in FIG. 9, the scheduling process finishes this turn of the processing target TV program data in the first processing loop L1 of FIG. 8.

After finishing executing step S106 (registration judgment subroutine according to FIG. 9) for all the TV program data of the recommended TV programs acquired in step S105, the scheduling process leaves the first processing loop L1 and finishes the scheduling processing illustrated in FIG. 8. When this scheduling processing is finished, the scheduling process terminates.

(Actions)

In a state in which the TV software 42 of the TVPC 40 (see FIG. 2) according to this embodiment is started, when the operator inputs a predetermined instruction by operating the input unit 40b, the remote control device 50, and the user interface module 42a, the automatic recording condition setting screen 61 (see FIG. 7) is displayed on the display unit 40a. When the operator designates automatic recording to be performed by selecting the radio button 61a, inputs the lower limit value (first threshold) of a free capacity of the disk medium in the disk drive unit 40f and the upper limit value (second threshold) of a total data amount of moving picture data recorded by automatic recording to the respective text boxes 61b and 61c, and clicks the condition update button 61d, the automatic recording condition information 422 is updated.

In this embodiment, as described above, the scheduling processing illustrated in FIG. 8 is periodically executed. In the scheduling processing, when automatic recording is designated to be performed (step S102; perform), recommended TV programs are extracted by the TV program extraction engine 421 (step S105) and registration judgment processing for registration in the record-scheduled TV program management table 42d (see FIG. 4) is performed for each of the extracted TV recommended programs (first processing loop L1).

In this registration judgment processing, the extracted recommended TV programs are record-scheduled (registered in the record-scheduled TV program management table 42d) in order one by one (step S203; Yes, step S205; Yes, and step S206). However, at a stage when any one of the recommended TV programs is about to be record-scheduled, when a provisional free capacity of the disk medium falls below the lower limit value (first threshold) set by the operator (step S203; No), record-scheduling for the recommended TV programs after the recommended TV program is not performed. At a stage when any one of the recommended TV programs is about to be record-scheduled, when a total data amount of moving picture data recorded by automatic recording exceeds the upper limit value (second threshold) set by the operator (step S203; Yes and step S205; No), record-scheduling for the recommended TV programs after the recommended TV program is not performed.

The actions described above are explained from another viewpoint.

FIGS. 10 to 13 are diagrams schematically showing the inside of the disk medium in which user data and moving picture data recorded by automatic recording are stored. Note that the user data is moving picture data of a TV program recorded with broadcast date and time and a channel number designated (i.e., moving picture data not recorded by automatic recording), text data and graphic data obtained by other application programs, the other application programs themselves, and the OS software 41.

Figure 10:
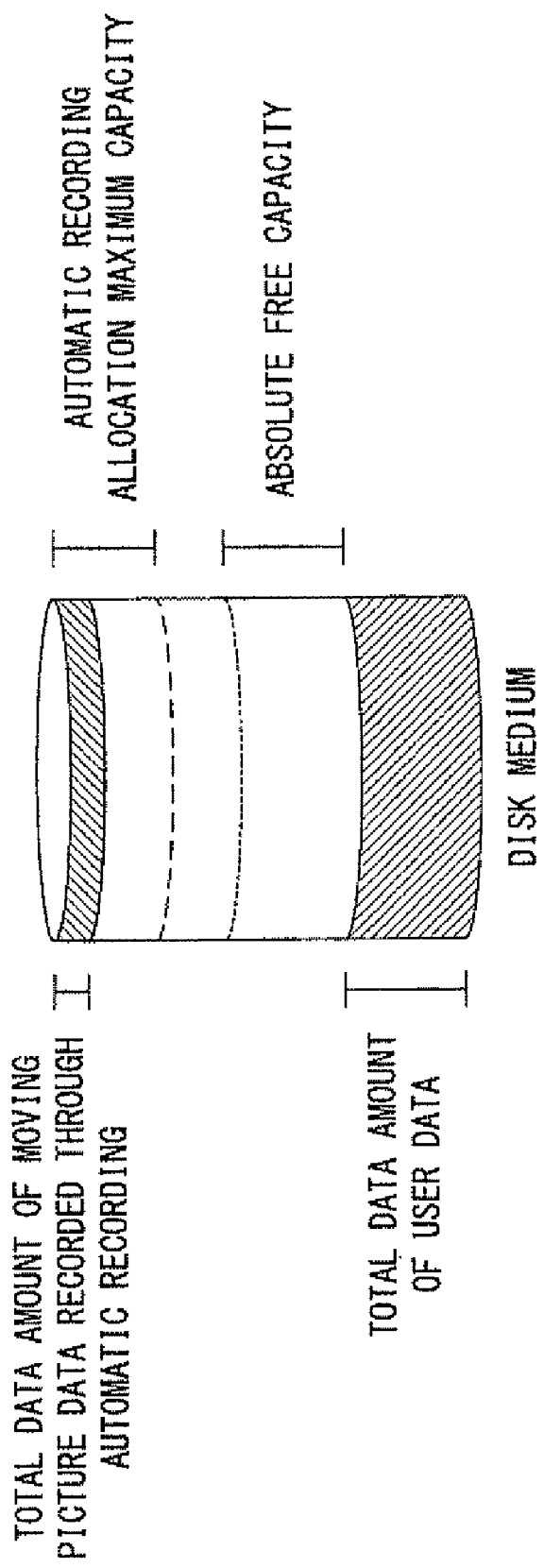
FIG. 10 A diagram showing a relation among a stored data amount, an absolute free capacity, and an automatic recording allocation maximum capacity.
Figure 11:
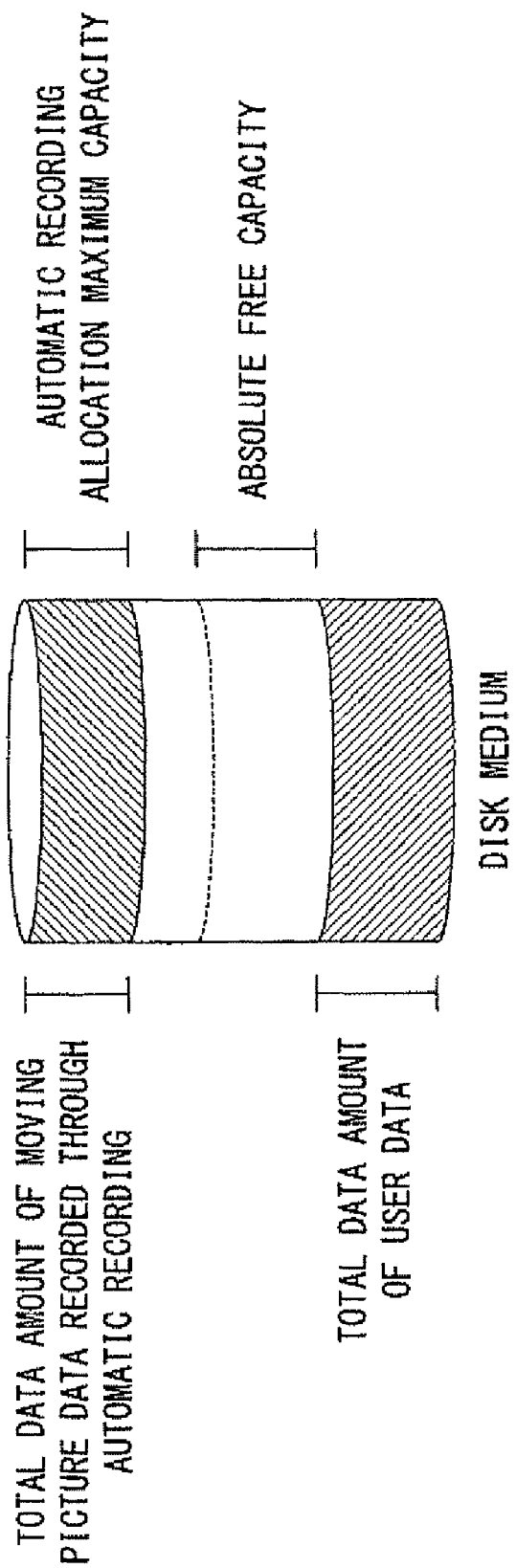
FIG. 11 A diagram showing a relation among a stored data amount, an absolute free capacity, and an automatic recording allocation maximum capacity.

As illustrated in FIGS. 10 and 11, when a sum of a total data amount of the user data, an absolute free capacity (capacity coinciding with the first threshold), and a maximum capacity allocated to the automatic recording module 42h (capacity coinciding with the second threshold) is smaller than a total capacity of the disk medium, the maximum capacity (capacity coinciding with the second threshold) is allocated to the automatic recording module 42h.

Therefore, as illustrated in FIG. 10, when a total data amount of the moving data recorded by automatic recording is smaller than the maximum capacity (capacity coinciding with the second threshold) allocated to the automatic recording module 42h, the automatic recording module 42h performs record-scheduling (registration in the record-scheduled TV program management table 42d) of the recommended TV programs (step S203; Yes, step S205; Yes, and step S206). Therefore, in the case of FIG. 10, the recommended TV programs are automatically recorded.

On the other hand, as illustrated in FIG. 11, when the total data amount of the moving picture data recorded by automatic recording coincides with the maximum capacity (capacity coinciding with the second threshold) allocated to the automatic recording module 42h or smaller than the maximum capacity by a slight amount (data amount smaller than a file size of a piece of moving picture data), the automatic recording module 42h does not perform record-scheduling of the recommended TV programs (step S203; Yes and step S205; No). Therefore, in the case of FIG. 11, the recommended TV programs are not automatically recorded.

Figure 12:
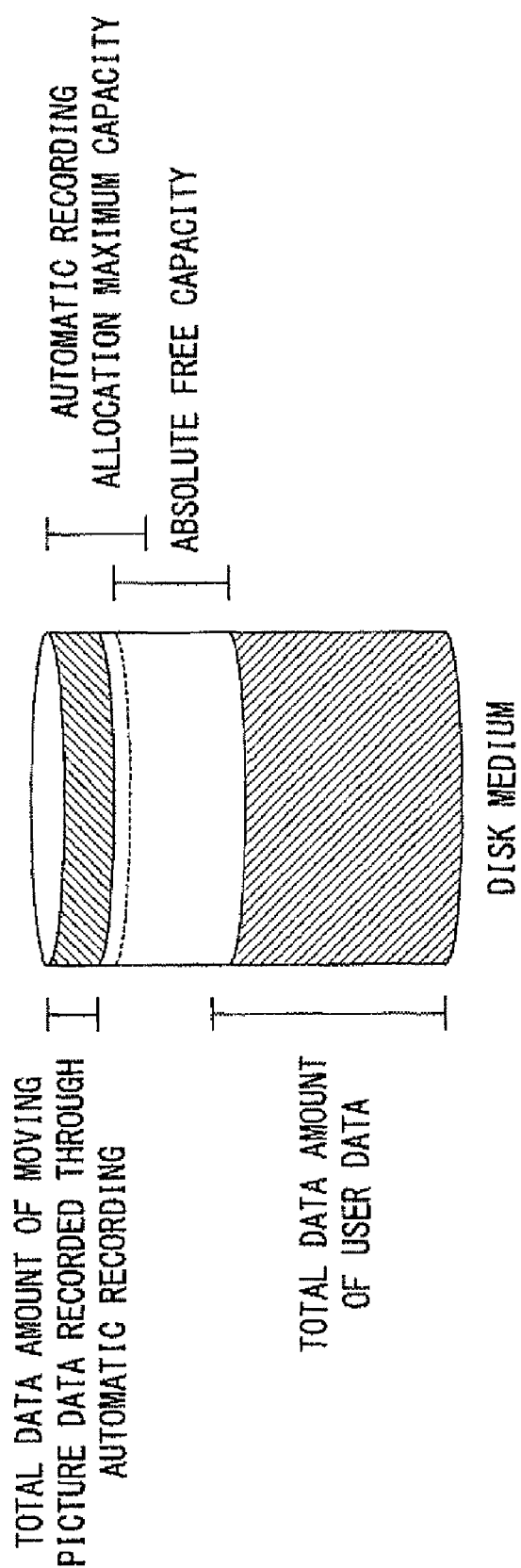
FIG. 12 A diagram showing a relation among a stored data amount, an absolute free capacity, and an automatic recording allocation maximum capacity.

As illustrated in FIG. 12, when a remainder obtained by subtracting the total data amount of the user data and the absolute free capacity (capacity coinciding with the first threshold) from the total capacity of the disk medium is smaller than the maximum capacity (capacity coinciding with the second threshold) allocated to the automatic recording module 42h, a capacity allocated to the automatic recording module 42h is a capacity reduced from the maximum capacity. Therefore, when the total data amount of the moving picture data recorded by automatic recording is smaller than a capacity remaining after the reduction, the automatic recording module 42h performs record-scheduling for the recommended TV programs (step S203; Yes, step S205; Yes, and step S206). Therefore, in the case of FIG. 12, the recommended TV programs are automatically recorded.

On the other hand, as illustrated in FIG. 13, when a remainder obtained by subtracting the total data amount of the user data and the total data amount of the moving picture data recorded by automatic recording from the total capacity of the disk medium is smaller than the absolute free capacity (capacity coinciding with the first threshold), the capacity allocated to the automatic recording module 42h is zero. Therefore, the automatic recording module 42h does not perform record-scheduling for the recommended TV programs (step S203; No). Therefore, in the case of FIG. 13, the recommended TV programs are not automatically recorded.

(Effect)

As described above, according to this embodiment, the upper limit value of the total data amount of the moving picture data that can be stored in the disk medium by automatic recording is determined and the absolute free capacity of the disk medium is secured as much as possible. Therefore, it is unlikely that text data, graphic data, and the like obtained by other application programs cannot be stored and new software cannot be installed. Moreover, it is unlikely that operations of the TVPC 40 become unstable.

(Explanation Concerning the Units)

In this embodiment explained above, all the respective units 40a to 40h in the TVPC 40 may be configured by software elements and hardware elements or may be configured by only hardware elements.

As examples of the software elements, an interface program, a driver program, a table, and data, as well as combinations of some of the foregoing can be cited. Those may be software elements stored in a computer readable medium described later or may be firmware fixedly incorporated in storage devices such as a read only memory (ROM) and a large scale integration (LSI).

As examples of the hardware elements, a field programmable gate array (FPGA), an application specific integrated circuit (ASIC), a gate array, a combination of logic gates, a signal processing circuit, an analog circuit, and other circuits can be cited. Among those hardware elements, an AND, an OR, a NOT, a NAND, a NOR, a flip-flop, a counter circuit, and the like may be included in the logic gate. Circuit elements that execute addition, multiplication, division, inversion, multiply-accumulate, differentiation, integration, and the like of signal values may be included in the signal processing circuit. Circuit elements that execute amplification, addition, multiplication, differentiation, integration, and the like may be included in the analog circuit.

Note that elements configuring the respective units 40a to 40h in the TVPC 40 described above are not limited to those cited as the examples above and may be other elements equivalent to those elements.

(Explanation Concerning the Software and the Program)

In this embodiment explained above, all of the TV software 42 in the TVPC 40, the respective modules 42a to 42c, 42e, 42g, and 42h, and the respective tables 42d and 42f configuring this TV software 42, as well as the software elements described above may include elements such as a software component, a component by a procedural language, an object oriented software component, a class component, a component managed as a task, a component managed as a process, a function, an attribute, a procedure, a subroutine (software routine), a fraction or a part of a program code, a driver, firmware, a microcode, a code, a code segment, an extra segment, a stack segment, a program area, a data area, data, a database, a data structure, a field, a record, a table, a matrix table, an array, a variable, and a parameter.

All of the TV software 42, the respective modules 42a to 42c, 42e, 42g, and 42h and the respective tables 42d and 42f configuring this TV software 42, as well as the software elements described above may be described in the C language, C++, Java (trademark of Sun Microsystems, Inc. in the United States), Visual Basic (trademark of Microsoft Corporation in the United States), Perl, Ruby, and other many programming languages.

Commands, codes, and data included in the TV software 42, the respective modules 42a to 42c, 42e, 42g, and 42h and the respective tables 42d and 42f configuring this TV software 42, as well as the software elements described above may be transmitted or loaded to a computer or a computer embedded in a machine or an apparatus through a cable network card and a cable network or through a wireless card and a wireless network.

In the transmission or the loading, a data signal is incorporated in, for example, a carrier wave to thereby move on the cable network or the wireless network. However, the data signal may be transferred while keeping a state of a so-called baseband signal without depending on the carrier wave. Such a carrier wave is transmitted in an electric, magnetic, or electromagnetic form, an optical or acoustic form, or other forms.

The cable network or the wireless network is, for example, a telephone line, a network line, a cable (including an optical cable and a metal cable), a wireless link, a cellular phone access line, a personal handyphone system (PHS) network, a wireless local area network (LAN), Bluetooth (trademark of Bluetooth SIG), a vehicle-mounted radio communication (including dedicated short range communication (DSRC)), and a network including any one of the foregoing. This data signal communicates information including commands, codes, and data to nodes or elements on the network.

Note that elements configuring the TV software 42, the respective modules 42a to 42c, 42e, 42g, and 42h and the respective tables 42d and 42f configuring this TV software 42, as well as the software elements described above are not limited to those cited as the examples above and may be other elements equivalent to those elements.

(Explanation Concerning a Computer Readable Medium)

Any one of the functions in this embodiment explained above may be encoded and stored in a storage area of a computer readable medium. In this case, a program that realizes the function can be provided to a computer or a computer embedded in a machine or an apparatus via this computer readable medium. The computer or the computer embedded in the machine or the apparatus can realize the function by reading the program from the storage area of the computer readable medium and executing the program.

The computer readable medium refers to a storage medium that accumulates, with an electric, magnetic, optical, chemical, physical, or mechanical action, information such as a program and data, and holds the information in a computer readable state.

As examples of the electric or magnetic action, writing of data in an element on a read only memory (ROM) configured by a fuse can be cited. As examples of the magnetic or physical action, development of a latent image on a paper medium by a toner can be cited. Note that information recorded on the paper medium can be read, for example, optically. As examples of the optical and chemical action, thin film formation or unevenness formation on a substrate can be cited. Note that information recorded in a form of unevenness can be read, for example, optically. As examples of the chemical action, an oxidation-reduction reaction on a substrate, oxide film formation, nitride film formation, or a photoresist development on a semiconductor substrate can be cited. As examples of the physical or mechanical action, unevenness formation on an emboss card or perforation in a paper medium by a punch can be cited.

Some of computer readable media can be detachably inserted in a computer or a computer embedded in a machine or an apparatus. As examples of the detachably attachable computer readable media, a DVD (including a DVD-R, a DVD-RW, a DVD-ROM, and a DVD-RAM), a +R/+WR, a BD (including a BD-R, a BD-RE, and a BD-ROM), a compact disk (CD) (including a CD-R, a CD-RW, and a CD-ROM), a magneto optical (MO) disk, and other optical disk media, a flexible disk (including a floppy disk (floppy is a trademark of Hitachi, Ltd.)), and other magnetic disk media, a memory card (compact flash (trademark of SunDisk Corporation in the United States), smart media (trademark of Toshiba Corporation), an SD card (trademark of SunDisk Corporation in the United States, Matsushita Electric Industrial Co., Ltd., and Toshiba Corporation), a memory stick (trademark of Sony Corporation), an MMC (trademark of Siemens Corporation in the United States and SunDisk Corporation in the United States), etc.), a magnetic tape, and other tape media, as well as a storage device incorporating any one of the foregoing can be cited. In some storage device, a dynamic random access memory (DRAM) or a static random access memory (SRAM) are further incorporated.

Some of the computer readable media are fixedly inserted in a computer or a computer embedded in a machine or an apparatus. As examples of the computer readable medium of this type, a hard disk, a DRAM, an SRAM, a ROM, an electrically erasable and programmable read only memory (EEPROM), a flash memory, and the like can be cited.

What is claimed is:

1. A non-transitory computer-readable medium encoded with a recording program for causing a computer to execute an operation, comprising:
    receiving each TV program identified by each piece of record-scheduled TV program information in a record-scheduled TV program information table and to record received TV program onto a storage unit;
    executing a first adding operation to add a piece of record-scheduled TV program information identifying a TV program, recording of which is designated by a user, to the record-scheduled TV program information table;
    automatically extracting a recommended TV program, recording of which is recommended, among TV programs scheduled to be broadcasted by a broadcasting station based on received electric program guide information; and
    executing a second adding operation to add a piece of record-scheduled TV program information identifying the recommended TV program to the record-scheduled TV program information table, and
    where the second adding operation does not add the piece of record-scheduled TV program information identifying the recommended TV program to the record-scheduled TV program information table when a free capacity of the storage unit is less than a first threshold or when a total amount of recommended TV programs in the storage unit exceeds a second threshold.

2. The non-transitory computer-readable medium according to claim 1,
    wherein the first threshold is a value obtained by adding a capacity required to store the extracted recommendation TV program to a first default value.

3. The non-transitory computer-readable medium according to claim 1,
    wherein the second threshold is a value obtained by subtracting a capacity required to store the extracted recommendation TV program from a second default value.

4. A recording method executed by a computer having a storage unit, the method comprising:
    receiving by a processor in the computer each TV program identified by each piece of record-scheduled TV program information in a record-scheduled TV program information table;
    recording by the processor received TV program onto the storage unit;
    adding by the processor a piece of record-scheduled TV program information identifying a TV program, recording of which is designated by a user, to the record-scheduled TV program information table;
    automatically extracting by the processor a recommended TV program, recording of which is recommended, among TV programs scheduled to be broadcasted by a broadcasting station based on received electronic program guide information; and adding by the processor a piece of record-scheduled TV program information identifying the recommended TV program to the record-scheduled TV program information table, the adding a piece of record-scheduled TV program information identifying the recommended TV program does not add the piece of record-scheduled TV program to the record-scheduled TV program information table when a free capacity of the storage unit is less than a first threshold or when a total amount of recommended TV programs in the storage unit exceeds a second threshold.

5. The recording method according to claim 4, wherein the first threshold is a value obtained by adding a capacity required to store the extracted recommendation TV program to a first default value.

6. The recording method according to claim 4, wherein the second threshold is a value obtained by subtracting a capacity required to store the extracted recommendation TV program from a second default value.

7. A recording apparatus, comprising:
a storage unit;
a recording unit to receive each TV program identified by each piece of record-scheduled TV program information in a record-scheduled TV program information table and to record each received TV program onto the storage unit;
a first adding unit to add a piece of record-scheduled TV program information identifying a TV program, recording of which is designated by a user, to the record-scheduled TV program information table;
an extracting unit to automatically extract a recommended TV program, recording of which is recommended, among TV programs scheduled to be broadcasted by a broadcasting station based on received electronic program guide information; and
a second adding unit to add a piece of record-scheduled TV program information identifying the recommended TV program to the record-scheduled TV program information table,
the second adding unit does not add the piece of record-scheduled TV program information identifying the recommended TV program to the record-scheduled TV program information table when a free capacity of the storage unit is less than a first threshold or when a total amount of recommended TV programs in the storage unit exceeds a second threshold.

8. The recording apparatus according to claim 7, wherein the first threshold is a value obtained by adding a capacity required to store the extracted recommendation TV program to a first default value.

9. The recording apparatus according to claim 7, wherein the second threshold is a value obtained by subtracting a capacity required to store the extracted recommendation TV program from a second default value.

* * * * *